United States Patent

[11] 3,544,050

| | | |
|---|---|---|
| [72] | Inventor | James C. Hammonds<br>St. Charles, Missouri |
| [21] | Appl. No. | 782,674 |
| [22] | Filed | Dec. 10, 1968 |
| [45] | Patented | Dec. 1, 1970 |
| [73] | Assignee | ACF Industries Incorporated<br>New York, New York<br>a corporation of New Jersey |

[54] RAILWAY TRAILER HITCH HAVING SAFETY MEANS
16 Claims, 15 Drawing Figs.

[52] U.S. Cl. .................................................... 248/119;
105/368
[51] Int. Cl. ........................................................ B60p 7/06;
B61d 3/16
[50] Field of Search ................................................ 248/119,
119(S); 105/368(S); 213/8

[56] References Cited
UNITED STATES PATENTS

| 3,142,466 | 7/1964 | Gutridge et al. ............... | 105/368(S) |
| 3,216,590 | 11/1965 | Bateson ......................... | 213/8 |
| 3,235,211 | 2/1966 | Robinson et al. ............... | 248/119(S) |
| 3,246,866 | 4/1966 | Price et al. ..................... | 105/368(S) |
| 3,337,170 | 8/1967 | Remy et al. ..................... | 248/119(S) |

*Primary Examiner*—Marion Parsons, Jr.
*Attorney*—Samuel J. Snyder and Eugene N. Riddle ABSTRACT: A trailer hitch on a railway car has a fifth wheel supporting strut which is held resiliently in an erect position by cushioning means. Safety means are provided which are actuated in response to a loss of cushioning or restoring force in the cushioning means. The safety means, when actuated, positively lock the strut in its erect position, and yet permit the hitch to be retracted, and prevent the hitch from being erected again by locking it to the car.

Patented Dec. 1, 1970

INVENTOR.
JAMES C. HAMMONDS
BY
Samuel J. Snyder
ATTORNEY

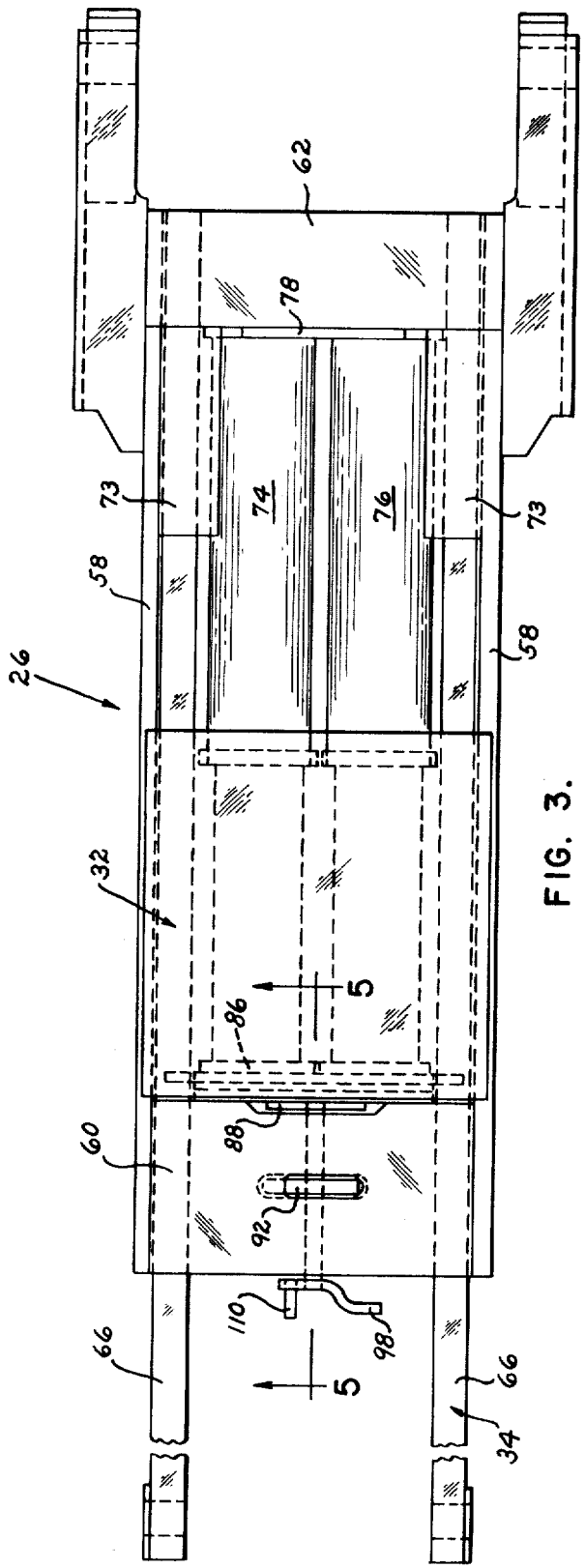
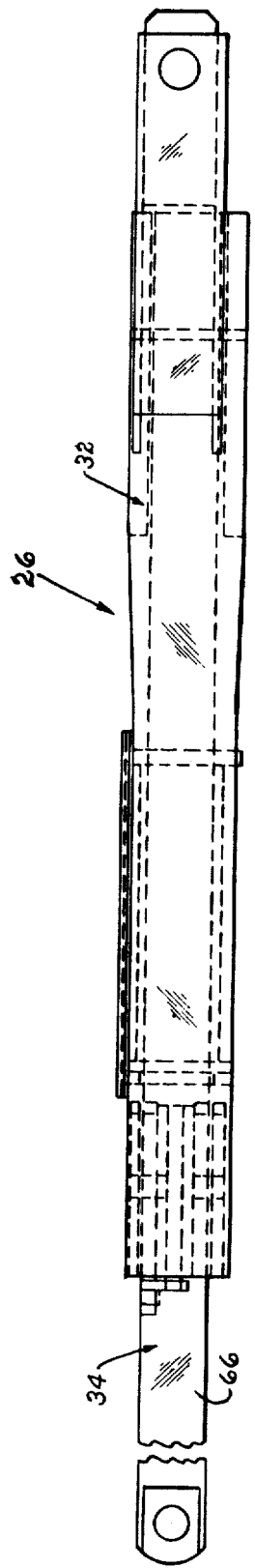
FIG. 3.
FIG. 4.

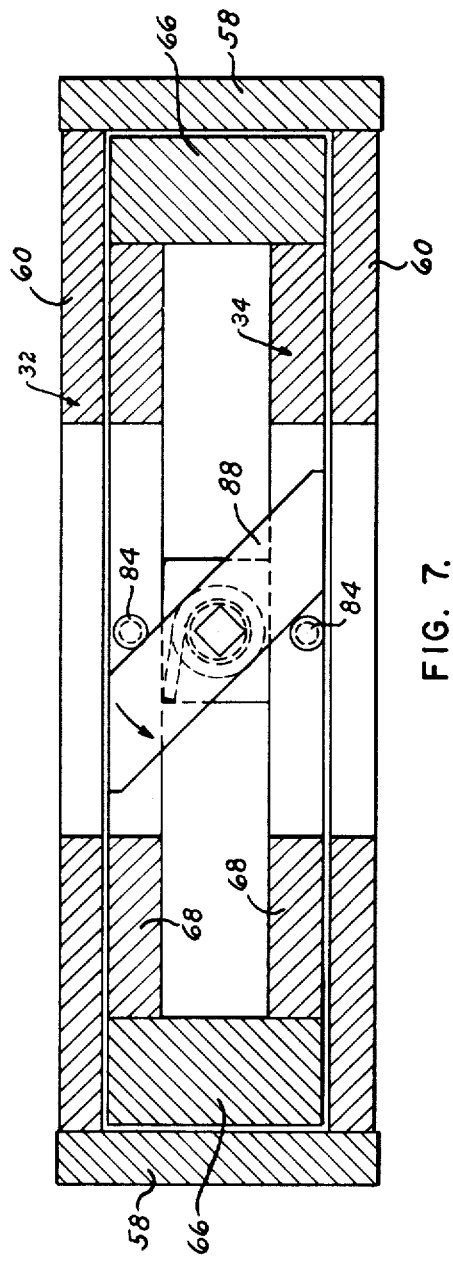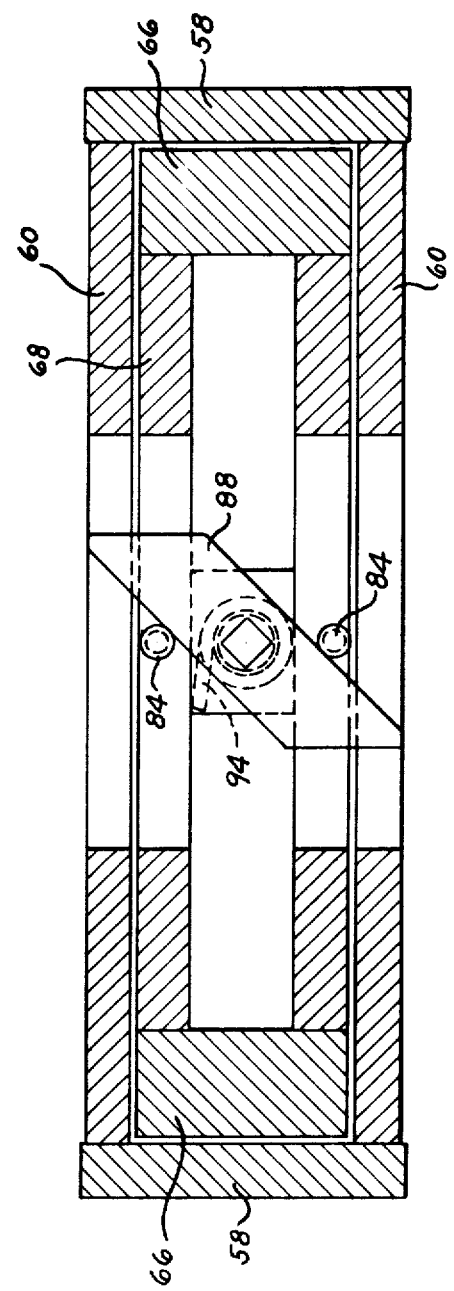

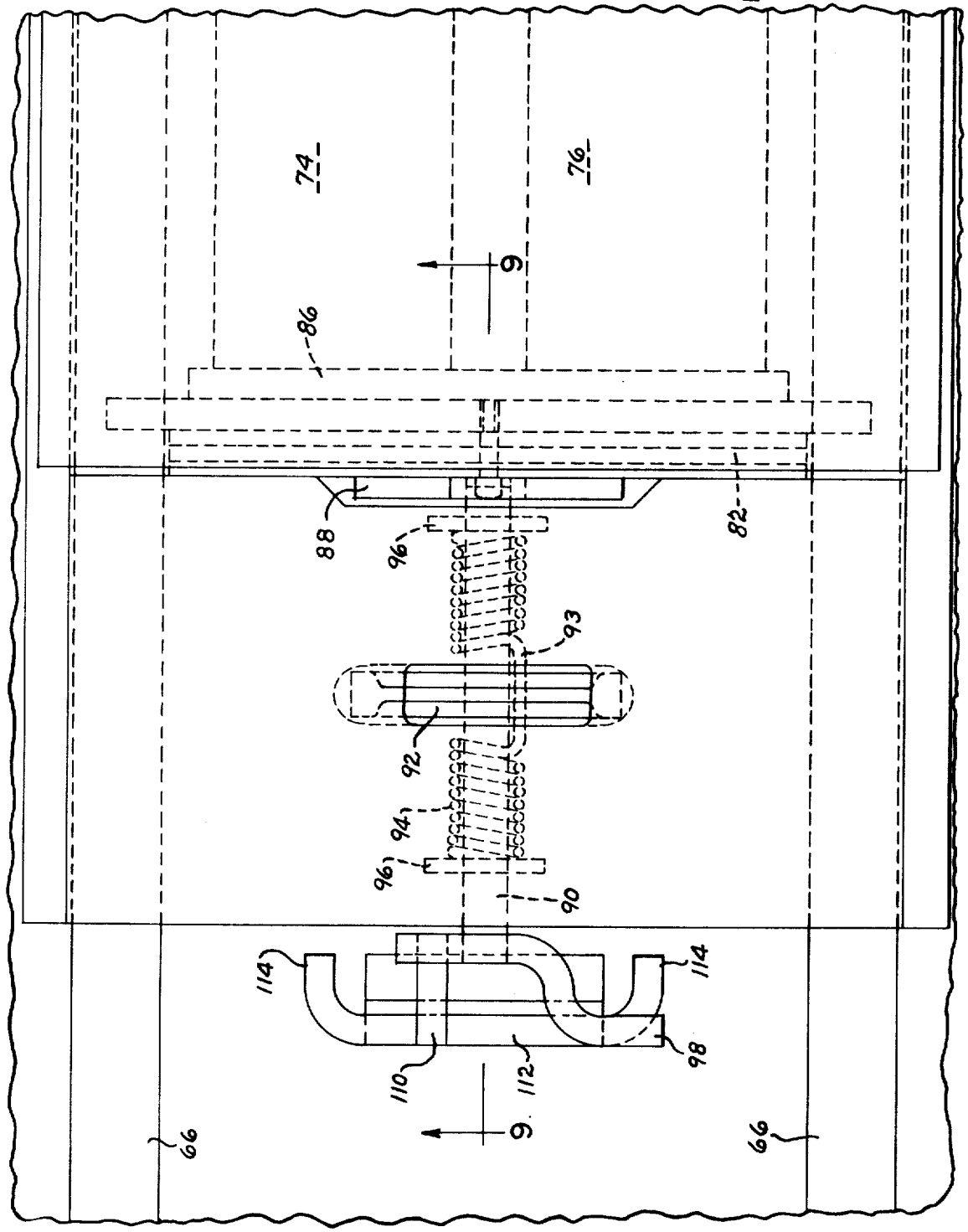

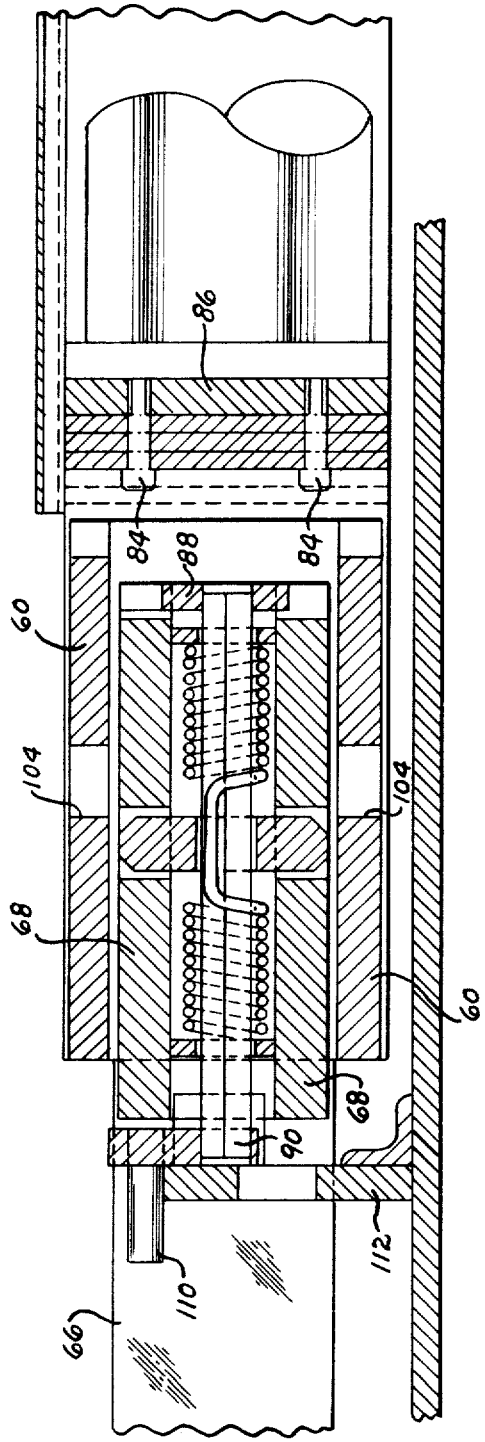
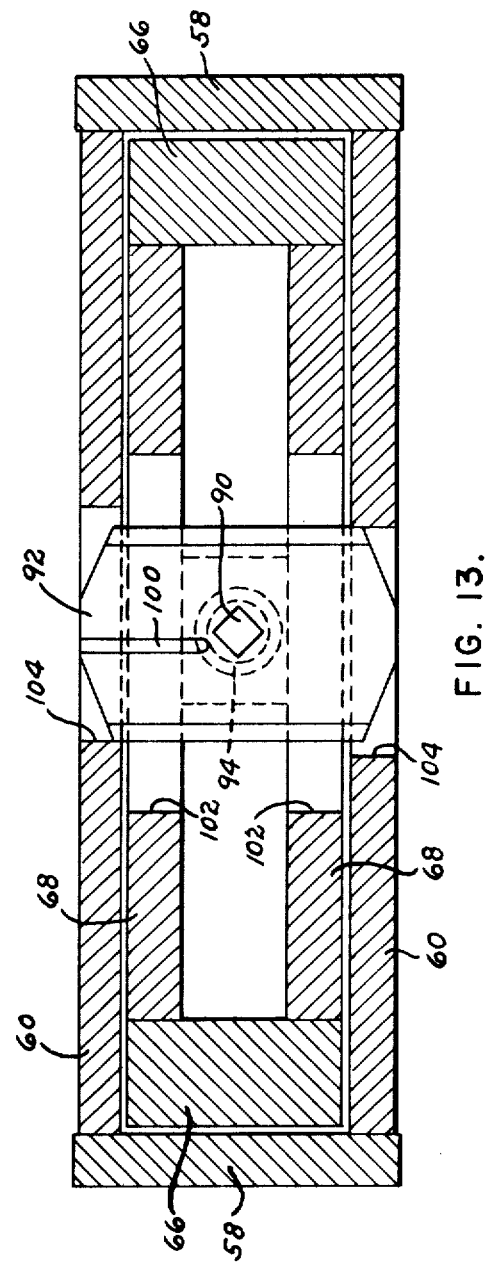

3,544,050

RAILWAY TRAILER HITCH HAVING SAFETY MEANS

BACKGROUND OF THE INVENTION

This invention is particularly concerned with cushioned trailer hitch structures for railway cars which are employed to secure a vehicle trailer or the like to a railway flat car for transporting the vehicle by rail. Cushioned railway trailer hitch structures are quite advantageous and provide effective protection for the cargo carried by railway vehicle trailers, but they are subject to a severe disadvantage in the event such structure subsequently becomes worn or damaged to the extent that cushioning ability of the hitch structure is severely reduced or rendered inoperative. In an oleo-pneumatic cushion this fault may result from a gas pressure drop. A defective cushioning unit structure may allow the trailer hitch to freely oscillate between its maximum limits, thereby allowing the vehicle trailer to move freely on the railway car. When this occurs, shock forces applied to the vehicle trailer may damage the trailer or its cargo, or even cause the trailer to break away from the hitch.

To prevent the great damage which may result from improper hitch operation, alarm or indicating devices have been provided to show whether the hitch is in proper operating condition. Such devices, however, do not afford protection against a fault which develops in actual transit, nor do they automatically establish a safe condition if a fault develops in transit, or prevent a faulty hitch from being put into use, and particularly do not guard against use of a hitch having an impaired cushioning means. U.S. Pat. No. 3,490,723, assigned to the assignee of this application, provides a fail-safe means which locks out the cushioning means if they become unsafe. The object of the present invention is to provide improved fail-safe means of this type, which also prevents the hitch from being used if the cushioning means are unsafe or ineffective.

SUMMARY OF THE INVENTION

The invention consists of a trailer-supporting hitch mounted on a railway car. The hitch has a pivoted upright strut, to the top of which is provided a fifth wheel plate for receiving the trailer kingpin, and a diagonal strut provided to the upright strut at one end and to the car at the other end. The diagonal strut has a pair of oleo-pneumatic cushions, containing gas under very high pressures. Means are connected to one of the struts for moving it along the deck of the car to raise and lower the hitch. The diagonal strut includes upper and lower telescoping members held in extended positions so as to hold the upright strut substantially vertical. Spring means, normally overbalanced by the cushions, release locking means which lock the upper and lower members of the diagonal strut against relative movement, when the force exerted by the cushions falls below the overbalancing level, due to a drop in gas pressure. The hitch, therefore, remains erect safely. When the hitch is lowered, the locking means engages a bracket on the deck of the car which cams the locking means to an open position. If an attempt is made to raise the hitch while the cushion pressure is deficient, the diagonal strut will be extended until it engages a pair of inwardly turned detents on a deck mounted bracket, thereby locking the hitch against elevation. Thus the hitch is prevented from being placed in operation with defective cushions.

BRIEF DESCRIPTION OF THE DRAWING

The drawing of this application includes the following FIGS.:

FIG. 3 is a top plan of the diagonal strut in the erect position of the trailer hitch with the hydraulic cushioning in an operable position.

FIG. 4 is a side view of the diagonal strut of FIG. 3.

FIG. 7 is a section taken generally along line 7-7 of FIG. 5.

FIG. 8 is an enlarged plan of connecting lock between the diagonal strut member in the collapsed position of the hitch with the cushioning unit in operable position.

FIG. 12 is a section similar to FIG. 7, but indicating a second latch member in latched position to lock the diagonal strut portions against relative longitudinal movement.

FIG. 13 is a section similar to FIG. 6, but indicating a latch member in latched position to lock the diagonal strut portions against relative longitudinal movement.

FIG. 15 is a section taken along line 15-15 of FIG. 14 and similar to FIG. 9, but showing the hydraulic cushion unit in an inoperable position with the diagonal strut portions being extended and engaging a detent on the deck to prevent raising of the hitch from a collapsed position when the hydraulic cushion unit is inoperable.

DESCRIPTION OF THE PREFERRED EMBODIMENTS

Figure 1:
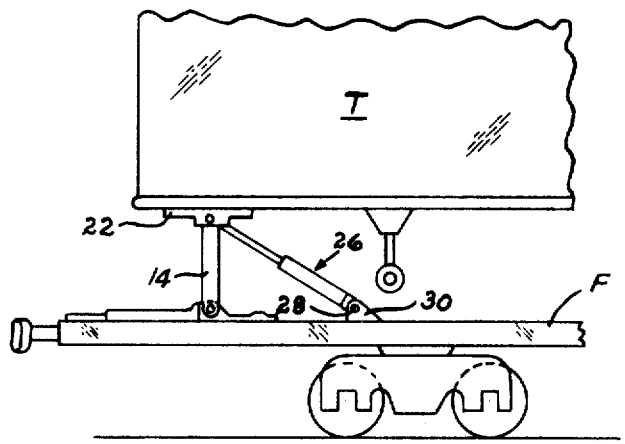
FIG. 1 is a partial side elevation of an end of a railway flat car having the trailer hitch securing a trailer thereon.
Figure 2:
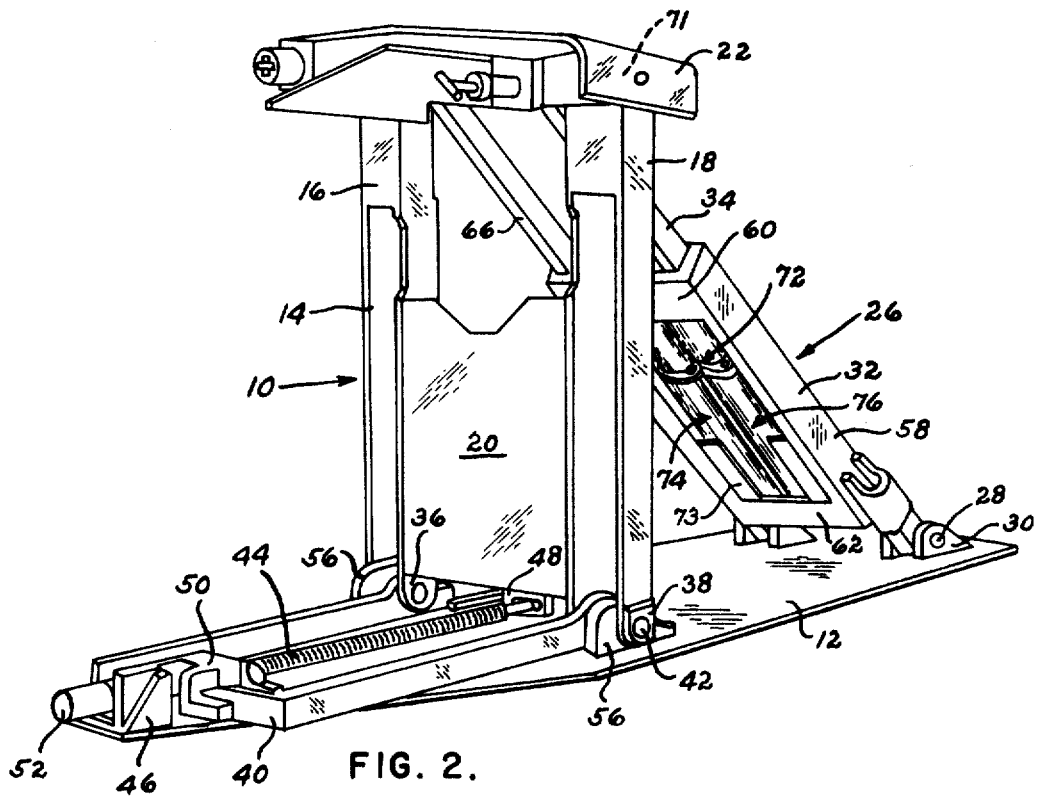
FIG. 2 is a perspective of the trailer hitch of FIG. 1 shown removed from the railway flat car.
Figure 5:
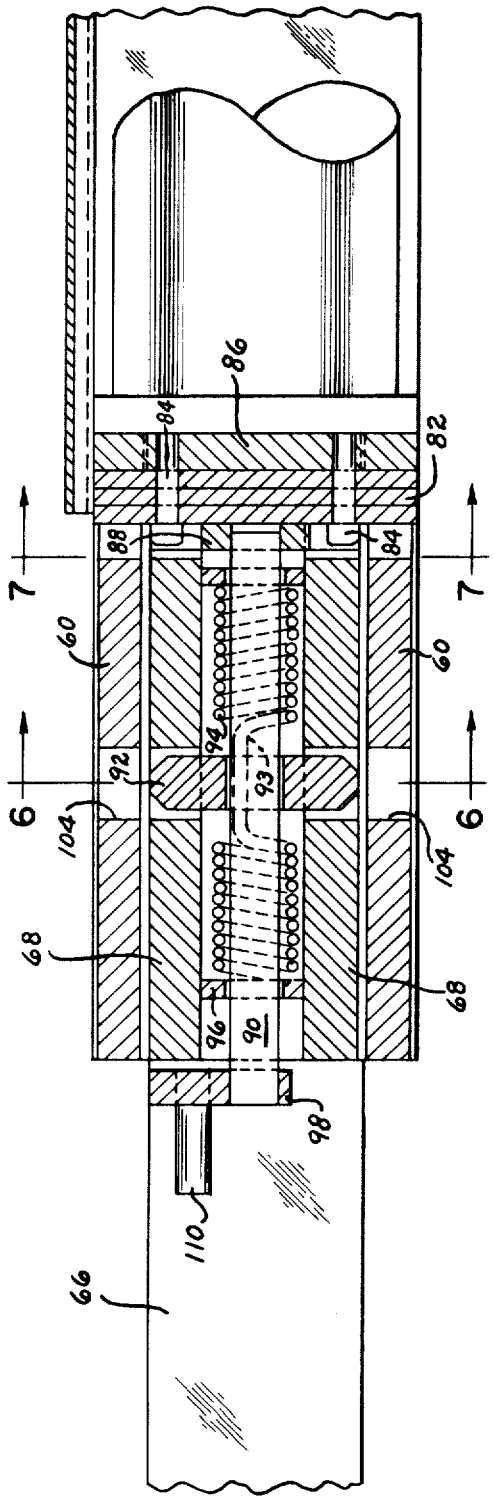
FIG. 5 is a section taken generally along line 5-5 of FIG. 3 and illustrating the position of the diagonal strut members with the hydraulic cushioning in an operable position.
Figure 6:
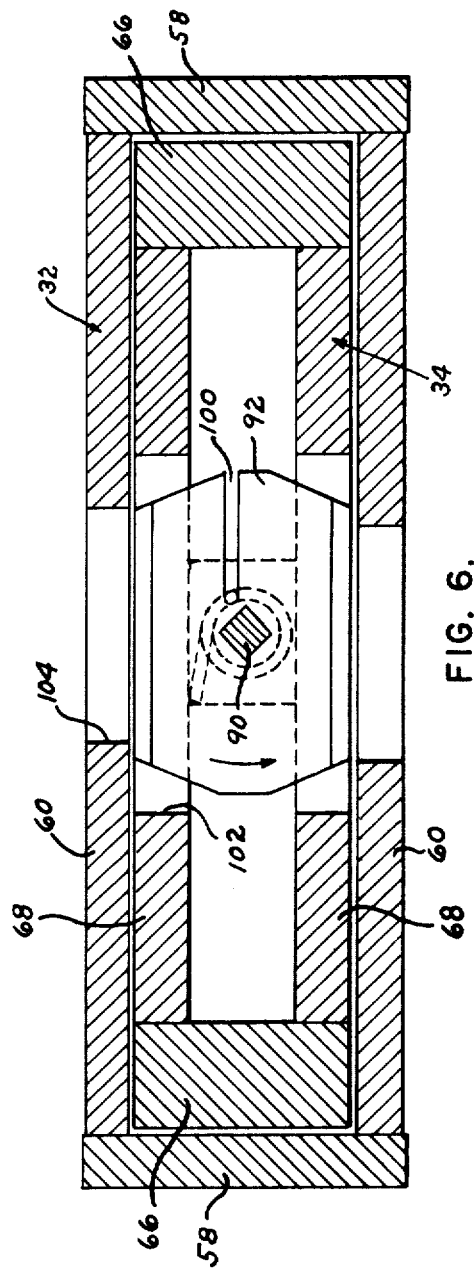
FIG. 6 is a section taken generally along line 6-6 of FIG. 5.
Figure 9:
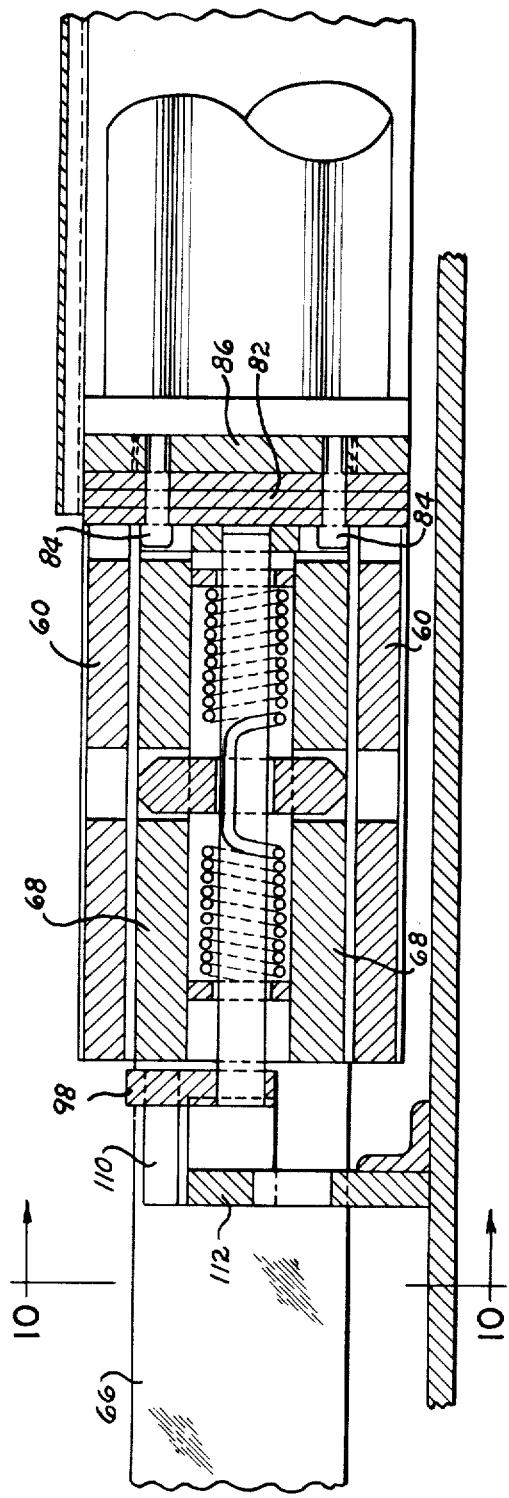
FIG. 9 is a section taken generally along line 9-9 of FIG. 8.

With reference now to the drawings, FIGS. 1 and 2 illustrate a trailer hitch or support device 10 for the fifth wheel of a semitrailer T to be transported by a railway flatcar F. The trailer hitch structure 10 is similar to that of U.S. Pat. application Ser. No. 759,973, now U.S. Pat. No. 3,490,723 having plate 12 which is fixed to the deck of the railway flatcar. The trailer hitch structure includes a vertical strut 14, including a pair of parallel legs 16 and 18 which are interconnected by means of a brace plate 20 or other similar bracing structure. A fifth wheel support structure 22 is connected by means of a pivot to the upper extremity of the legs 16 and 18, and is adapted to pivot from a position substantially normal to the vertical strut 14 in the upright position of the hitch as shown in FIG. 1, to a position substantially parallel to the vertical strut 14 in the collapsed position of the hitch 10. This pivotal movement allows the fifth wheel support to be disposed in substantially parallel relation with the base plate 12 in both the upright and collapsed positions of the hitch.

The fifth wheel support 22 may be constructed in accordance with any one of a number of commercially acceptable types which releasably secure the fifth wheel of a semitrailer to the trailer hitch structure.

The trailer hitch is provided with a diagonal strut or leg shown generally at 26, which is pivotally connected to the upper extremity of the vertical strut 14 and has its lower extremity connected by means of a pivot 28 to a lug 30, which is welded to the base plate 12. The diagonal leg 26 is constructed in the form of a telescoping frame including an outer frame 32 which receives an inner frame 34 in telescoping relation therein. The specific construction of the diagonal leg 26 and its operative relationship with the structural elements of the trailer hitch 10 will be set forth in detail hereinbelow.

Each of the vertical parallel legs 16 and 18 of the vertical strut 14 is bifurcated at its lower extremity defining inner and outer clevis plates 36 and 38 respectively. A horizontal operating frame 40 is connected by means of pivots 42 to the inner clevis plates 36 thereby establishing pivotal connection between the horizontal frame and the vertical strut 14. An operating screw 44 for raising and lowering the trailer hitch 10 between its operative and stored or collapsed positions is retained in parallel relation with the base plate 12 by bearing structures 46 and 48. The operating screw 44 is provided with drive threads and is threadingly received within an internally threaded frame drive assembly 50 carried by the operating frame 40, as disclosed in U.S. Pat. No. 3,145,006. The operating screw 44 is provided at its outer extremity with drive connection structure 52 for connecting the operating screw to manual or mechanical means for imparting rotation to the operating screw.

In the operative position of the trailer hitch 10 as illustrated in FIG. 1, the pivot pins 42 are maintained in engagement with abutment lugs 56, which are fixed to the base plate 12 by welding or the like. In the operative position of the trailer hitch as shown in FIGS. 1 and 2, the pivot pins 42 will form a substantially fixed pivot for the lower extremities of the vertical supports. To lower the trailer hitch to its stored or collapsed position, the operating screw 44 is rotated in a direction driving the operating frame 40 rearwardly toward the lugs 30. The operating frame 40, by virtue of its connection with the vertical support, will force the lower portion of the vertical strut 14 rearwardly, thereby causing the vertical support to be lowered to a position where it lies flat on the base plate 12 or on the deck of the railway car. At the same time, the fifth wheel support will pivot to a position where it is substantially parallel with the vertical strut 14 and will be lowered with the vertical strut until it rests flat on or adjacent to the deck of the railway car.

With reference now to FIGS. 2, 3, and 4, the diagonal leg 26 comprises a pair of parallel outer rails 58 having transverse brace plates 60 and 62 fixed therebetween to maintain the rails 58 in substantially parallel relationship and defining a generally rectangular parallelogram. The inner frame 34, which comprises a pair of substantially parallel rails 66, having upper transverse brace plates 68 and lower brace plates (not shown), is received in telescoping relationship within the outer frame 32. The lower extremity of the outer frame 32 is connected to the pivot lug 30 by the pivot pin 28. The upper pivot pin connecting the fifth wheel support to the vertical support is also received within pivot apertures 71 formed at the extremity of the inner frame 34, thereby pivotally connecting the upper portion of the diagonal leg to the fifth wheel support assembly 22 and the vertical support 14. The parallelogram structure defined by the outer frame 32 and the inner frame 34 interfit to define a generally rectangular opening in which is disposed a cushioning unit assembly illustrated generally at 72.

The cushioning unit assembly 72 comprises a pair of oleopneumatic cushioning units shown generally at 74 and 76 which are disposed in generally parallel relationship. The cushioning unit assembly 72 is provided at its lower extremity with a guide plate 78 which is received between the inner rails 66, and which retains the lower portion of the cushioning unit in assembly within the diagonal leg structure. The normally disposed lower transverse plates (not shown) between rails 66 also form an abutment for the guide plate 78. Upper and lower pairs of fillet members 73 are fixed to the outer frame 32 by welding or the like and serve to prevent lateral misalignment of the cushioning units relative to the diagonal leg structure.

It is apparent that the cushioning unit assembly 72 is compressed to dissipate energy regardless of the direction of impact which is transmitted to the diagonal leg of the hitch. In the centered or neutral position of the diagonal leg, the guide plate 78 is disposed in engagement with the transverse plates on the outer frame and inner frame, respectively. In the centered position of the diagonal leg, the upper guide plate 86 is maintained in abutment with the transverse plates 68 of the inner frame 34 and the transverse plates 60 of the outer frame 32. If impact forces cause the vertical support 14 to be rotated rearwardly about the pivot 42, the inner frame 34 will be telescoped inwardly relative to the outer frame 32. When this occurs the transverse support plates 68, being rigid with the inner frame 34, will force the upper portion of the cushioning unit assembly 72 in a rearward direction. Under this condition, the lower transverse support plates of inner frame 34 will move out of contact with the lower guide plate 78, and the guide plate 78 will be maintained in abutment with the transverse plate 62 of the outer frame 32, thereby causing the cushioning unit assembly 72 to become compressed and resulting in energy dissipation.

If impact forces on the trailer cause the vertical support to rotate forwardly about its pivot, the inner frame telescopes outwardly with regard to the outer frame. When this occurs, the transverse plate 68 will move out of abutment with the upper guide plate 86, and the transverse plate 60 of the outer frame 32 will prevent upward movement of the uppermost portion of the cushioning unit assembly. The lower transverse plates (not shown) of the inner frame, however, will move the lower guide plate 78 out of abutment with the transverse plates 62, thereby causing compression of the cushioning unit assembly, which results in dissipation of energy. It is therefore clearly apparent that impact loads from either direction causing either forward or rearward pivoting of the vertical strut 14 will result in compression of the cushioning unit assembly and dissipation of energy.

Figure 11:
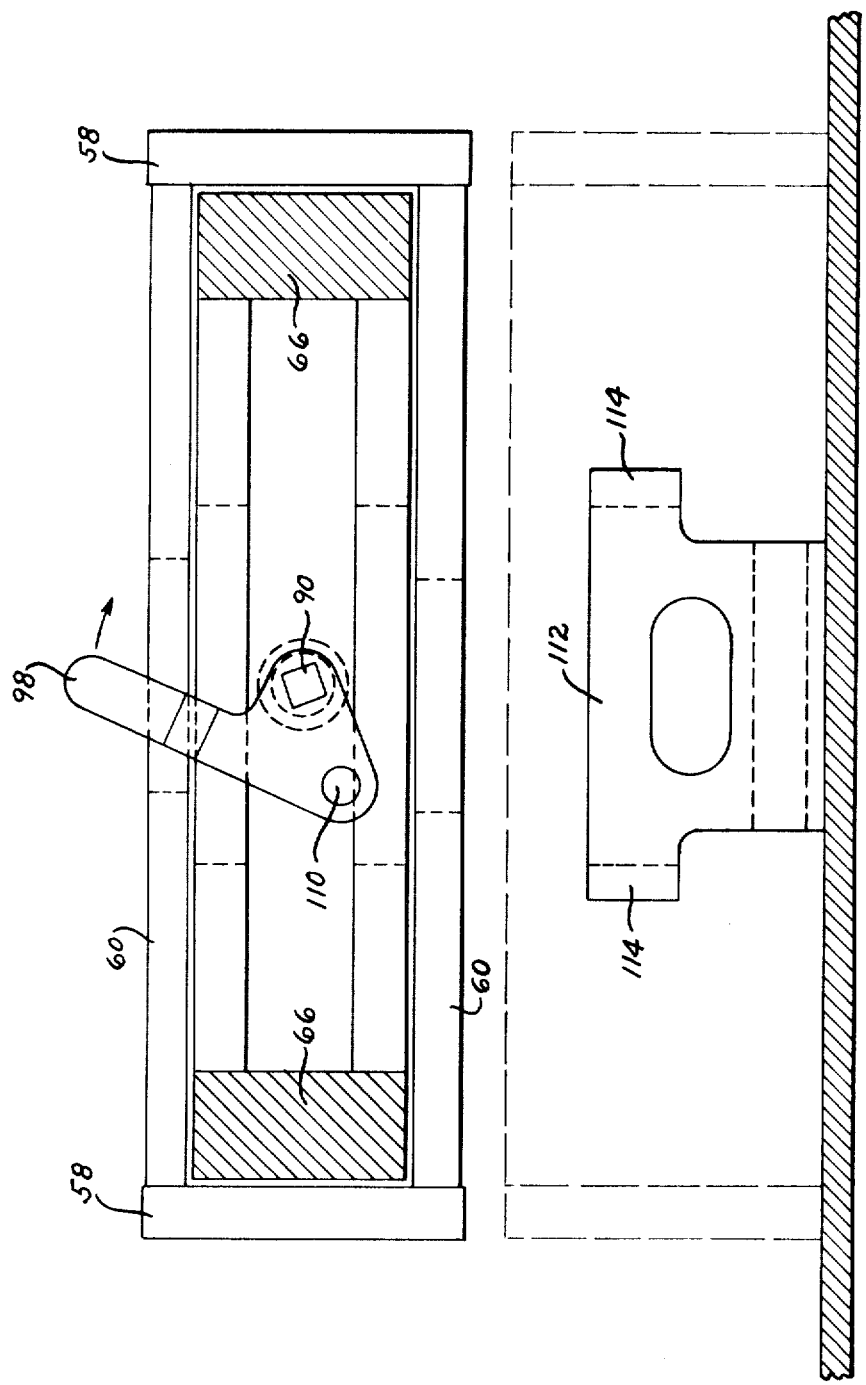
FIG. 11 is an end elevation illustrating the diagonal strut being lowered to a collapsed position with the hydraulic cushioning in inoperative position with the diagonal strut portions locked against relative longitudinal movement.
Figure 14:
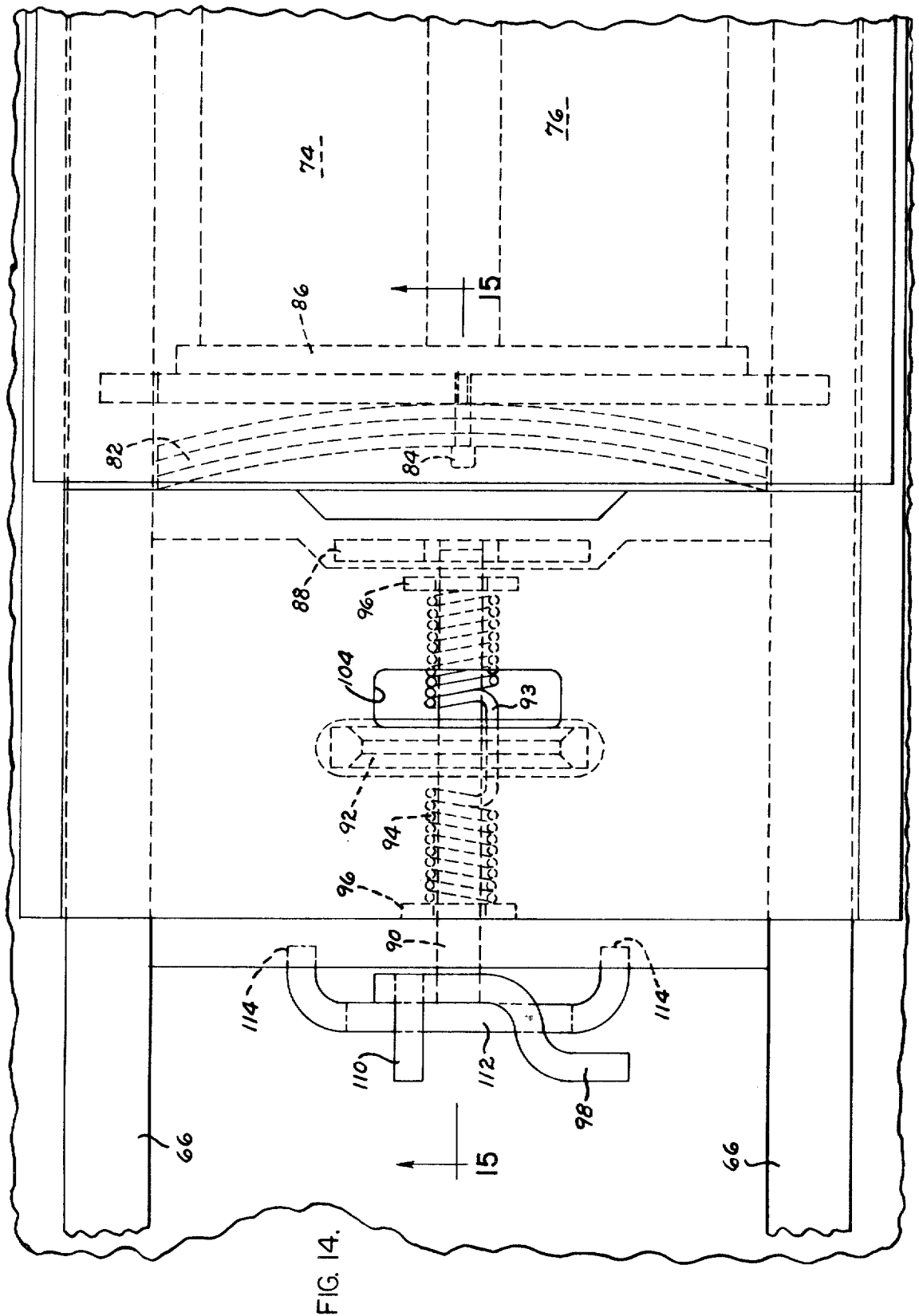
FIG. 14 is a top plan similar to FIG. 8, but illustrating the cushion unit in inoperable position.

FIGS. 5 to 9 show safety means for enabling the hitch to support the trailer when cushion pressure is lost. The portion of strut member 34, formed by legs 66 and plates 68, is a rectangular frame within another rectangular frame formed by the upper portions of legs 58 and plates 60. At their lower ends both rectangular frames abut leaf springs 82. A pair of pins 84 threaded in guide plate 86 extend through the middle of leaf springs 82, while the ends of the springs are free. If the fluid pressure in cushions 74, 76 drops sufficiently, due to a leak or other causes, the leaf springs 82 will bow as indicated in FIGS. 14 and 15 and push guide plate 86 and pins 84 downward, or to the right. The withdrawal of pins 84 releases trigger element 88 to move from its inoperative position of FIG. 7 to its operative position of FIG. 12. Trigger element 88 is fixed to square shaft 90, which extends through a locking member 92, biased spring 94, end plates 96, and into handle 98. A midportion 93 of spring 94 passes through slot 100 of locking member 92, and both ends of spring 94 are suitably anchored. When trigger element 88 is released, spring 94 turns locking member 92 90° to the position shown in FIG. 13, in which position it is stopped by plates 60. Locking member 92 then extends into slots 102 and 104 in plates 60 and 68, and locks together the upper and lower portions 32, 34 of diagonal strut 26. This can only occur when slots 102 and 104 are alined and strut 14 is vertical, when the hitch is in operative position. Thus, the hitch is prevented from collapsing or partially collapsing due to a loss of cushion gas pressure. The hitch is, therefore, made secure automatically in optimum trailer supporting position upon a failure of the cushioning means. When handle 98 is in the position shown in FIG. 11, it indicates that the safety mechanism has been operated and that the hitch requires repair.

Figure 10:
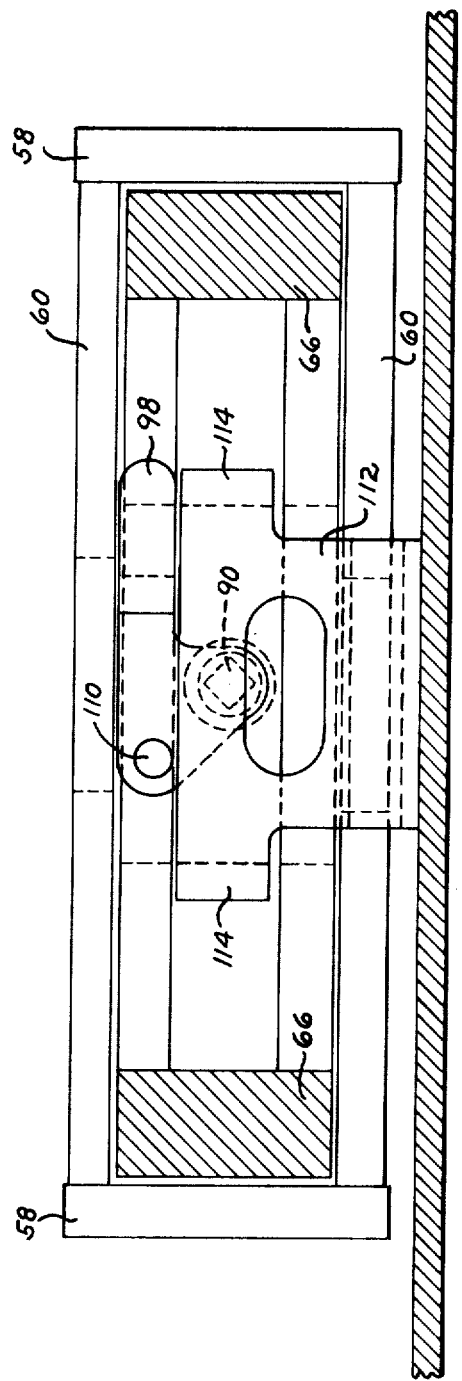
FIG. 10 is a view taken generally along line 10-10 of FIG. 9.

When the trailer hitch is lowered by turning screw 44, after the diagonal strut 26 has been made rigid by the safety locking mechanism described above, arm 110 of handle 98 engages the top of bracket 112 and causes handle 98 to turn clockwise into the position shown in FIG. 10. Thus, shaft 90 and locking member 92 and trigger 88 are turned to unlock strut 26. Leaf springs 82, however, remain bowed and cushions 74 and 76 stay compressed, an indicated in FIG. 14. If, at any later time, screw 44 is turned to raise the hitch, while the cushion pressure is below a predetermined level, upper frame 34 will be moved outwardly, as indicated in FIG. 15, without the exertion of enough upward thrust to raise the hitch. As portion 34 of diagonal strut 26 is extended, the detents 114 of bracket 112 enter the space between plates 68 of strut 34, and the hitch is locked against upward movement. Thus, the hitch is prevented from being placed in operation when the pressure of cushions 74, 76 is below a safe level.

The operation of the hitch is evident from the foregoing description thereof, and it is apparent that the hitch contains safety mechanism which stiffens or rigidifies the diagonal strut automatically if cushion pressure fails during transit, and which prevents a retracted hitch from being placed in operation if the cushion pressure has failed. Thus, the hitch must be repaired to a safe condition before it can be placed in operation again.

I claim:

1. In a collapsible hitch for supporting a trailer on the deck of a railway car comprising: a fifth wheel plate adapted to engage the kingpin of a trailer; a pivoted vertical strut having its upper end connected to the fifth wheel plate; a diagonal strut pivotally connected to the car at one end and to the vertical strut at its other end, said diagonal strut including two longitudinally displaced members slidable relative to each other; resilient cushioning means in said diagonal strut for holding said members displaced and for cushioning relative movement therebetween; and means for enabling said hitch to be raised and lowered between collapsed and operative trailer supporting positions, the improvement comprising safety means responsive to a predetermined loss in cushioning capability of said cushioning means for preventing the hitch from being raised from a collapsed position to an operative position.

2. A hitch according to claim 1, wherein said safety means locks said hitch to the deck of the car.

3. A hitch according to claim 1, wherein said safety means locks said diagonal strut members together in a displaced position in response to said predetermined change in said cushioning means.

4. A hitch according to claim 1, wherein said cushioning means includes an oleo-pneumatic cushion.

5. A hitch according to claim 1, wherein said safety means, when operated, latches the hitch to the deck of the car when said means for raising and lowering the hitch is operated to raise the hitch.

6. In a collapsible hitch for supporting a trailer on a railway car, comprising: a strut pivotally mounted on the car for movement between substantially horizontal and vertical positions, a fifth wheel plate pivoted to the top of said strut, cushioning means connected to said strut for holding it in an erect position and for cushioning impacts on said strut and restoring it to an erect position after an impact, the improvement including safety means responsive to a loss of cushioning of said cushioning means for disabling said hitch in a collapsed position so as to prevent it from being erected.

7. A hitch according to claim 6, wherein said safety means includes means for positively locking said strut in an erect position in response to a loss of restoring force by said cushioning means.

8. A hitch according to claim 7, wherein said safety means locks said strut in a horizontal position to the car in response to a loss of restoring force by said cushioning means.

9. In a collapsible hitch for supporting a trailer, comprising: a substantially vertical strut; a fifth wheel plate pivotally connected to the top of said strut; a diagonal strut, including cushioning means, pivotally connected to an upper point of said vertical strut; means responsive to a predetermined loss of cushioning for disabling said cushioning means and rendering said diagonal strut rigid; means for lowering said hitch; and means responsive to lowering of the hitch for restoring said diagonal strut to a nonrigid cushioned condition.

10. In a collapsible trailer supporting hitch having: an upright strut pivotally mounted on the deck of a railway car and a fifth wheel plate pivotally connected to the upper end of said strut for receiving a trailer kingpin; a diagonal strut pivotally connected to an upper portion of said upright strut and extending rearwardly therefrom to a pivotal connection on the deck of said car, said diagonal strut including relatively movable upper and lower portions for enabling said diagonal strut to expand or contract; and cushioning means connected to said upper and lower portions of the diagonal strut for holding it in an extended position with a predetermined force; and safety means for interlocking said upper and lower portions for preventing relative movement thereof, and thereby preventing said diagonal strut from contracting and expanding, said safety means including a latching member rotatable on an axis extending longitudinally of the diagonal strut; means on said upper and lower diagonal strut portions adapted to be engaged by said rotatable latching member; latch-operating spring means for rotating said latching member to its interlocking position; and means responsive to a drop of cushioning force for releasing said spring means to cause rotation of said latching member.

11. Apparatus according to claim 10, wherein said safety means includes a rotatable shaft fixed to said latching member and a mechanical spring interposed between one end of the cushioning means and said upper and lower diagonal strut portions for initiating rotation of said latching member when said mechanical spring compresses said cushioning means.

12. Apparatus according to claim 11, wherein said upper and lower diagonal strut portions have registering slots for receiving said latching member.

13. Apparatus according to claim 11, including an indicator connected to said shaft for indicating the position of said latching member.

14. Apparatus according to claim 11 including a second rotatable latch member fixed to said rotatable shaft, a stop in the path of rotation of said second latch member, and means responsive to a compression of the cushioning means by said mechanical spring for removing said stop from the path of said second latch member.

15. In a collapsible hitch for supporting a trailer on the deck of a railway car comprising: a fifth wheel plate adapted to engage the kingpin of a trailer; a pivoted vertical strut having its upper end connected to the fifth wheel plate; a diagonal strut pivotally connected to the car at one end, and to the vertical strut at its other end; said diagonal strut including two longitudinally displaced members slidable relative to each other; fluid pressure cushioning means in said diagonal strut for holding said members displaced and for cushioning relative movement therebetween; and means for enabling said hitch to be raised and lowered between collapsed and operative trailer-supporting positions; the improvement comprising safety means to positively lock the longitudinally displaced members of the diagonal strut against relative longitudinal movement upon a predetermined low fluid pressure being reached in said fluid pressure cushioning means, said safety means including a lock rotatable between locked and unlocked positions with respect to said longitudinally displaced members, a shaft on which said lock is secured for rotation, and leaf spring means operatively connected between said lock and said fluid pressure means, said leaf spring means being actuated upon a predetermined low pressure being reached in said fluid pressure means to permit rotation of said shaft and lock for positively locking together the longitudinally displaced members of the diagonal strut.

16. In a collapsible hitch as set forth in claim 15, a torsion spring connected to said shaft and urging said shaft and lock to locked position with respect to said longitudinally displaced members of the diagonal strut, a trigger secured to said shaft adjacent said leaf spring means, and catch means between said trigger and said leaf spring means to hold said trigger against rotation when said leaf spring means are compressed by said fluid pressure means, said trigger being released by said catch means upon a bowing of the leaf spring means when the fluid pressure means reaches a predetermined low pressure.